UNITED STATES PATENT OFFICE.

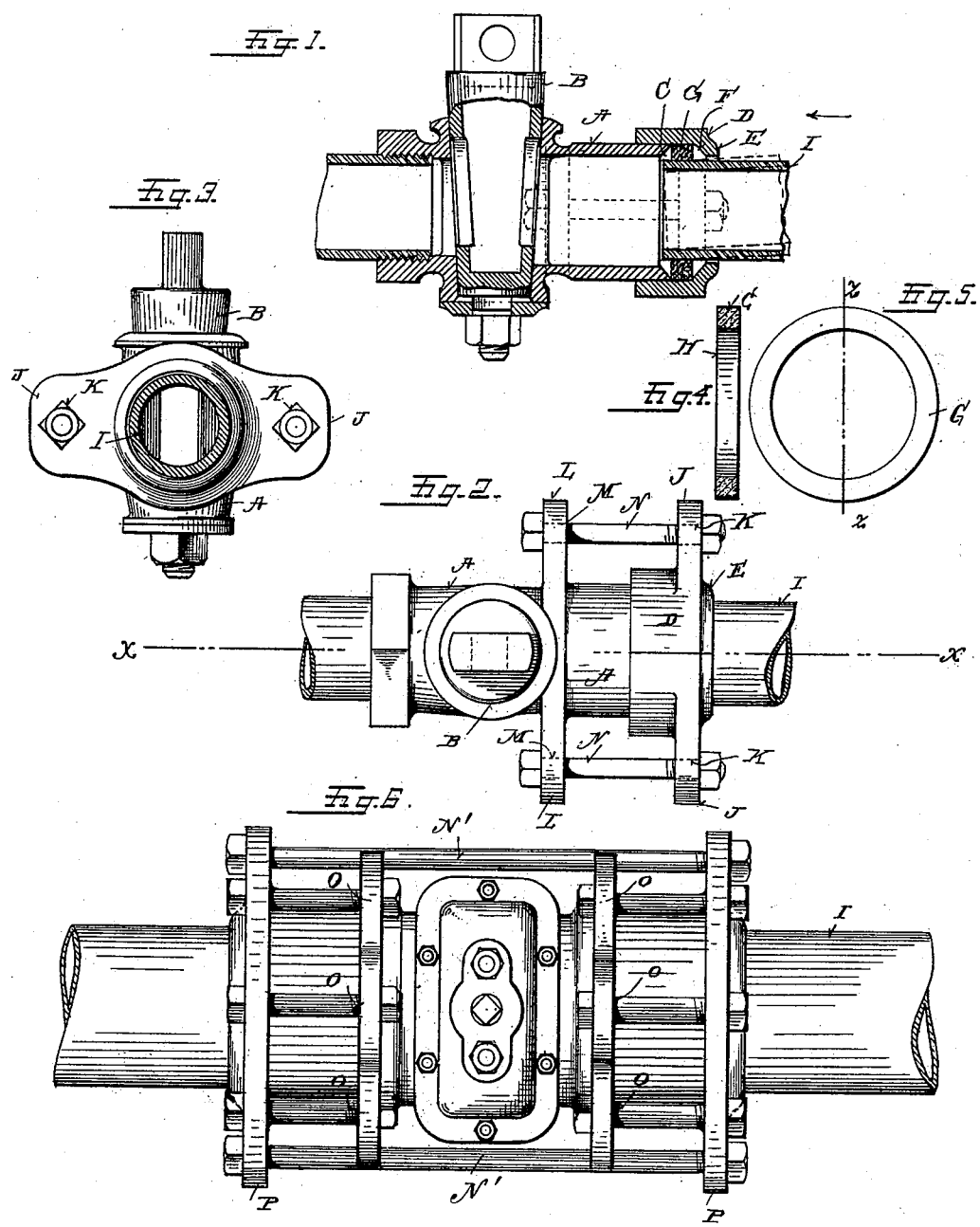

ELMER D. ABBOTT, OF SPRINGFIELD, OHIO, ASSIGNOR OF ONE-HALF TO JAMES W. R. CLINE, OF SAME PLACE.

COMBINED VALVE AND UNION.

SPECIFICATION forming part of Letters Patent No. 618,971, dated February 7, 1899.

Application filed August 6, 1898. Serial No. 687,995. (No model.)

*To all whom it may concern:*

Be it known that I, ELMER D. ABBOTT, a citizen of the United States, residing at Springfield, in the county of Clark and State of Ohio, have invented certain new and useful Improvements in a Combined Valve and Union, of which the following is a specification, reference being had therein to the accompanying drawings.

This invention relates to certain new and useful improvements in a combination valve and union.

The object of this invention is to provide a yieldable connection between a stop cock or valve and a pipe connecting therewith whereby the pipe may be laid at more or less of an angle to said valve when desired and at the same time the connection between the pipe and valve will be such that gas or liquids will be unable to escape at the point where they are connected with each other.

My invention also relates to details of construction and arrangement hereinafter appearing, and particularly pointed out in the claims.

In the accompanying drawings, on which like reference-letters indicate corresponding parts, Figure 1 is a longitudinal sectional view of a stop cock or valve with my improvements applied thereto, the section being taken on the line *x x* of Fig. 2. Fig. 2 is a plan view of the same complete. Fig. 3 is an end view of what is shown in Fig. 2, looking in the direction of the arrow, the connecting-pipe being in section; Fig. 4, a sectional view of a packing-ring, the section being taken on the line *z z* of Fig. 5; Fig. 5, a plan view of the same; Fig. 6, a plan view of a gate-valve with my invention applied to each end thereof.

This invention is specially designed for use in connection with stop-cocks connecting house service-pipes with gas or water street-mains, although it will be understood that I do not confine myself to the use of this invention in connection with stop-cocks, as it may be used in connection with a large variety of valves.

In connecting with house service-pipes it frequently occurs that they are laid up a slight incline, and in such cases particularly, unless the plumber is very careful, he is more than likely to strain the connection between the pipe and valve to such an extent that within a short time a leak will occur. With the idea of overcoming this difficulty I have produced the invention herein and have found that it fully serves the purpose for which it was intended and at the same time permits of readily disconnecting it from the service-pipe when it is desired to repair the main or street pipe.

The letter A represents the outer shell of a stop-cock, while the letter B represents the cock-plug, which is adapted to be opened and closed by a valve key or stem in the ordinary manner. The outer end of the valve-casing is slightly beveled inward, as shown at C in Fig. 1. A union D fits over the end of the shell A and is provided with an annular inward extension E. This extension is beveled in the opposite direction to the bevel on the stop-cock, as shown at F. Between these two bevels is fitted a packing or gasket G, which is preferably square in cross-section, as shown at H. Within this gasket is inserted a pipe I, which in the illustration is one end of a house service-pipe. From each side of the union project extensions J, each of which is provided with a bolt-hole, as shown at K in Fig. 3 and in dotted lines in Fig. 2. In the form of check-valve shown in Fig. 2 particularly I have provided lugs or extensions L, in which are holes M, corresponding with the holes in the extensions J.

In order to adjust the union upon the stop-cock, I connect them together by means of bolts N, which pass through the holes M and K, respectively. When the pipe I is placed within the gasket G and the nuts on the bolts N are tightened, the gasket, by reason of the bevel on the end of the stop-cock and in the union, is forced snugly against said pipe I to any desired degree, according to the tension of the bolts N. Thus it will be seen by this construction that the pipe I might have a slight angular connection with the stop-cock and at the same time the rubber gasket would be snugly drawn about it, so that said pipe may be laid up an incline, if desired or necessary. In actual practice it has been ascertained that even under a pressure of from three to five hundred pounds per square inch a joint thus constructed will be perfectly tight, and at the same time is so simple that it may be readily connected and disconnected by an unskilled laborer without the necessity of making large excavations, which are required where long pipe-tongs are employed for screwing the pipe into the stop-cock, as has heretofore been necessary.

Referring to Fig. 6, it will be seen that I have applied my invention to each end of a gate-valve, in which case, in addition to securing the union to the ears of extensions from said valve, I connect the two unions together direct. It will further be understood that where a union is desired for each end of a stop-cock these unions may be connected by bolts N' direct, if so desired. In large gate-valves a larger number of bolts are required for securing the unions in place, especially when they are used in connection with very high pressure, and in such cases I cast or otherwise secure a number of extensions around the valve, where through-bolts cannot be used, for connecting with the respective unions, as shown at O. In the cases where a large number of fastenings are required instead of providing a number of extensions from the union a circumferential flange may be substituted, the same having as many holes as required, as clearly seen at P in Fig. 6.

Having thus fully described my invention, what I claim as new, and desire to secure by Letters Patent, is—

1. In a combined valve and union, the combination with a valve having one of its ends beveled, a union adapted to fit over said beveled end, a packing between said valve and said union, one or more extensions projecting from said union, and one or more extensions projecting from said valve, each of said extensions having a hole or opening therein for the reception of a bolt, whereby the union is drawn toward the valve and said packing is forced into close contact with a pipe inserted therein.

2. In a combined valve and union, the combination with a valve having inlet and outlet extensions, beveled inward at their ends, of a union for each extension also having a beveled surface therein, a gasket between the beveled ends of said extensions and the bevel in said unions, and said unions being connected together by means of a bolt or bolts, to adjust the unions toward each other, whereby the packings or gaskets are forced into close contact with the ends of pipes projecting therein, substantially as shown and described.

In testimony whereof I affix my signature in presence of two witnesses.

ELMER D. ABBOTT.

Witnesses:
W. M. McNAIR,
C. L. SNIDER.